2,902,439

RECLAMATION OF ALUMINUM FABRICATING LUBRICANTS

Wendell C. Milz and William M. McClintock, New Kensington, Pa., assignors to Aluminum Company of America, Pittsburgh, Pa., a corporation of Pennsylvania No Drawing. Application July 3, 1958
Serial No. 746,318

3 Claims. (Cl. 208—183)

This invention relates to the reclamation of metal working lubricants. More particularly, it is directed to the purification of lubricants used in the fabrication of aluminum and aluminum base alloys to make them suitable for further use in metal working processes.

In the fabrication of aluminum and aluminum base alloy articles, such as rolling, drawing, machining and milling, hydrocarbonaceous lubricants are employed to reduce friction, minimize surface deterioration of the article and reduce wear and pick-up on fabricating tools. However, these lubricants readily become contaminated with metallic aluminum and aluminum oxide flakes and particles and, to a lesser extent, iron and steel from the fabricating equipment. Additionally, soaps, carboxylic acids and other carbon products often result from decomposition of the lubricant itself during service.

Analyses of lubricants after several days of service will often show aluminum (both metallic and oxide) contamination of from 0.02 to 3.0 percent by weight depending upon the viscosity of the oil and its use. The ash content may vary between about 0.02 and 3.2 percent by weight and iron contamination may often exceed 0.05 percent by weight.

Effective low cost maintenance of these aluminum fabricating lubricants has been a pressing problem, not only because periodic purification extends the life of the lubricants but also because cleaner oils result in a cleaner fabricated article as well as reduce health hazards. The fine metallic particles have a tendency to mar the surface of the metal article and the carbonaceous contaminants tend to stain the otherwise bright appearance.

Several methods have been generally employed prior to this invention. Adsorbent filtration with fuller's earth and mechanical filtration plus adsorbent treatment require constant replacement of the filter media as well as fail to remove very small contaminating particles which accumulate and appreciably reduce the service life of the lubricant. Treatment with sulfuric acid as disclosed by U.S. Patent 2,339,520 to Riesmeyer often fails to remove all the finer contaminants and is believed to chemically alter some of the constituents.

It is an object of this invention to provide a method for the reclamation of hydrocarbonaceous lubricants used in the fabrication of aluminum and aluminum base alloys.

It is also an object to provide a cleaning solution which is capable of use with a wide variety of hydrocarbonaceous lubricants.

Other objects and advantages will become evident from a reading of the following detailed specification and claims.

It has now been discovered that hydrocarbonaceous lubricants used in the fabrication of aluminum and aluminum base alloys can be reclaimed and purified by a method in which the oil contaminated with aluminum particles is admixed with an aqueous cleaning solution consisting of sodium aluminate and sodium hydroxide, agitated until a color change occurs, and the used cleaning solution containing the contaminants is separated therefrom.

Reclamation of the less viscous oils can be conducted at room temperature but the process is greatly accelerated if the admixture is maintained at a temperature between about 120° F. and 210° F. during the agitation step, and preferably about 180° F. except for the more volatile materials such as mineral spirits. In order to satisfactorily treat the more viscous oils, elevated temperatures must be employed to permit sufficient contact with the cleaning solution, and often to permit separation of the phases and settling of the floc.

The completion of the reaction between the cleaning solution and the contaminants is evidenced by a sudden change in color or brightening of the admixture which is presumably effected by the initiation of contaminant precipitation.

The separation of the used cleaning solution containing the contaminants is conveniently accomplished by transferring the admixture to a settling tank or by permitting it to remain quiescent in the mixing apparatus until the oil phase clears, after which the aqueous phase may be drawn off. A centrifugal separator may also be employed, in addition to or in place of the separating tank. After the separation, the clarified oil may be passed through a mechanical and/or adsorbent filter, although this is generally unnecessary. During the separation step, admixtures containing very viscous oils must be maintained at a temperature sufficiently high to render the admixture fluid and allow relatively complete separation of the two phases and settling of the contaminants.

Because the caustic cleaning solution attacks the metallic aluminum with the release of hydrogen, foaming of the admixture may occur. This may be controlled by adding the cleaning solution to the lubricant over a prolonged period of time. Additionally, for lubricants highly contaminated with colloidal aluminum, i.e. above about 0.1 percent by weight, or which exhibit an undesirable amount of foaming upon treatment, a preliminary settling out of some of the larger contaminant particles may usually be effected by merely maintaining the lubricant at a temperature above about 120° F. Needless to say, the hydrogen gas evolved by the admixture is of an explosive nature; proper venting and grounded or static free systems should be utilized.

The aqueous cleaning solution of the present invention consists essentially of sodium aluminate and sodium hydroxide, although other non-interfering agents may also be present. The solution should generally contain at least equal parts by weight of sodium aluminate and sodium hydroxide, and preferably about 3 parts sodium hydroxide per part of sodium aluminate for greater activity. However, where foaming becomes a problem, such as in the very light or highly contaminated oils, decrease of the sodium hydroxide ratio is desirable. Larger ratios of sodium hydroxide tend to produce excessive activity resulting in foaming and emulsification. Since the water is only a vehicle, excessive dilution is not generally desirable. For most purposes, a solution containing 1.25 percent by weight of sodium aluminate and 3.75 percent by weight of sodium hydroxide has been effective.

The aqueous cleaning solution is preferably added to the lubricant in an amount sufficient to provide 0.2 to 0.6 gram of sodium aluminate per liter of oil, and its companion amount of sodium hydroxide. Generally, only 20 ml. of the above-described cleaning solution is necessary to clean a liter of dirty oil. Lesser amounts of the cleaning solution require longer treatment period and greater amounts may often produce excessive foaming and emulsion formation, as well as increase the cost of the process.

In some instances, particularly in the treatment of naphthenic base materials, the floc formed by the cleaning solution is quite slow in settling. It has been found that the settling can be greatly accelerated by adding about 1 part of sulfuric acid per 1000 parts of admixture. Analysis of the reclaimed oil indicates no sulfate contamination.

Various types of hydrocarbonaceous fabricating lubricants may be treated in accordance with this invention, including paraffinic, naphthenic and mixed base mineral oils, synthetic oils such as the polybutenes, esters of fatty acids, and mixtures thereof. These generally vary in viscosity from about 28 to 1000 seconds (100° F.), Universal Saybolt, although the process may be employed also on materials having a viscosity of up to 6500 S.S.U. (100° F.) by means of heated separators. The mineral and synthetic oil lubricants referred to above can be used alone although they are generally used in combination with 1 to 20 percent of various modifying agents such as fatty acid esters and fixed oils or fats. Among these are butyl stearate, butyl laurate, palm oil, cocoanut oil, cotton seed oil, peanut oil, sperm oil, fish oil, spermaceti, tallow, lard fat and horse fat, or mixtures of these materials.

Indicative of the efficacy of the present invention are the following examples.

*Example 1*

A black, opaque used rolling lubricant consisting of 95 percent by weight mixed straight mineral oils and 5 percent butyl stearate color was analyzed and found to contain 0.1 percent by weight of aluminum (both metallic and oxide) and 0.02 percent by weight of water. The viscosity was 45 S.S.U. (100° F.).

The oil was heated to a temperature of 180° F. and to it was added an aqueous cleaning solution containing 1.25 percent by weight of sodium aluminate and 3.75 percent by weight of sodium hydroxide at a ratio of 20 parts per 1000 parts of oil (by volume). The admixture was maintained at a temperature of about 180° F. and agitated until a color change occurred (15 minutes) after which it was transferred to a settling chamber. In 60 minutes, the phases had separated and the oil was decanted. Upon analysis, the reclaimed lubricant was found to be free from aluminum, sodium and water, and had a light yellow color.

*Example 2*

A used wire drawing oil (viscosity—100 S.S.U. at 100° F.) consisting of a mixture of mineral oil and lard oil exhibited a dirty black opaque color and was determined to contain 0.06 percent by weight of aluminum values.

The oil was heated to a temperature of about 180° F. and to it was slowly added a cleaning solution as constituted and in the ratio described in Example 1, but over a period of about 60 minutes, while the mixture was being heated and agitated; in this manner, foaming was reduced. The agitation and heating were continued until a color change occurred (30 minutes) after which the admixture was transferred to a settling tank. The clear amber oil was decanted after about 8 hours and analyzed. No aluminum, sodium or water were found.

*Example 3*

A heavy wire drawing lubricant comprised of a polybutene base with a butyl stearate additive was found to have a viscosity of 5000 S.S.U. (100° F.). The dirty oil had a black opaque color and analysis showed it to contain 0.32 percent by weight of aluminum and 0.02 percent by weight of sodium.

The used oil was preheated at a temperature of about 285° F. for 48 hours and then decanted. This procedure removed the larger aluminum particles which settled out by gravity. The oil was allowed to cool to about 200° F. and to it was added slowly the cleaning solution described in Example 1. A total volume of cleaning solution equal to 20:1000 parts oil was added over a 90-minute period while the admixture was being agitated and maintained at a temperature of about 200° F. The heated agitation was continued for about 25 minutes when a color change occurred, after which the admixture was transferred to settling chamber which was maintained at a temperature of about 200° F. After 4 hours, the phases had separated and the clean oil was decanted. Analysis indicated no aluminum or sodium contamination.

*Example 4*

A high reduction rolling lubricant having a viscosity of 48 S.S.U. (100° F.) after several days use exhibited a dark black opaque color and was found to contain 0.04 percent by weight of aluminum. Twenty parts of the cleaning solution described in Example 1 was added to 1000 parts of the dirty oil which had been heated to a temperature of about 180° F. The admixture was agitated and maintained at temperature until the color changed, 10 minutes later, after which the admixture was allowed to settle for sixty minutes. The light yellow oil was decanted and found to be free from aluminum, sodium and water contamination.

*Example 5*

A powder milling lubricant consisting of mineral spirits and having a viscosity of 29 S.S.U. (100° F.) exhibited a dark grey color after 4 days' use. Analysis indicated that it contained 0.10 percent by weight of aluminum. To used spirits which were heated to a temperature of 125° F. was added an aqueous cleaning solution containing 2.5 percent by weight of sodium aluminate and 2.5 percent by weight of sodium hydroxide in the ratio of 20 parts per 1000 parts of spirits (by volume). The mixture was maintained at temperature and agitated for 15 minutes at which time a color change occurred. The admixture was transferred to a settling tank and 1 part of sulfuric acid per 1000 parts (by volume) of admixture were added. The aqueous phase and floc settled after thirty minutes to leave a clear yellow product which analysis showed to be free from aluminum, sodium, sulfate and water.

The treatment of the present invention is highly effective as evidenced by the foregoing examples. Furthermore, it has been reported that the reclaimed oils are equal to and often superior to new lubricant, especially with respect to odor and staining.

Having thus described the invention, we claim:

1. In the reclamation of hydrocarbonaceous lubricants utilized in the fabrication of aluminum and aluminum base alloy articles and contaminated with aluminum particles, the method comprising: admixing with said lubricant an aqueous cleaning solution containing essentially sodium aluminate and at least an equal weight of sodium hydroxide; agitating the admixture at a temperature of 120 to 210° F. until a color change occurs; and thereafter separating the aqueous cleaning solution containing said contaminants.

2. In the reclamation of hydrocarbonaceous lubricants utilized in the fabrication of aluminum and aluminum base alloy articles and contaminated with finely divided colloidal aluminum particles, the method comprising: admixing with said lubricant an aqueous cleaning solution containing essentially sodium aluminate and sodium hydroxide, the solution containing substantially 3 parts by weight of sodium hydroxide per part of sodium aluminate; agitating the admixture until a color change occurs, said admixture being maintained at a temperature between about 120° F. and 210° F.; and thereafter separating the aqueous cleaning solution containing said contaminants.

3. In the reclamation of hydrocarbonaceous lubricants utilized in the fabrication of aluminum and aluminum base alloy articles and contaminated with finely divided colloidal aluminum particles, the method comprising: admixing with said lubricant an aqueous cleaning solution containing essentially sodium aluminate and at least an equal weight of sodium hydroxide, said cleaning solution providing substantially 0.2 to 0.6 grams of sodium aluminate per liter of said lubricant; agitating the admixture until a color change occurs, said admixture being maintained at a temperature between about 120° F. and 210° F. and thereafter separating the aqueous cleaning solution containing said contaminants.

References Cited in the file of this patent

UNITED STATES PATENTS 1,747,161 Clark _____ Feb. 18, 1930